United States Patent [19]
den Hollander

[11] 4,130,783
[45] Dec. 19, 1978

[54] SIDE PINCUSHION CORRECTION CIRCUIT WITH LOW DISSIPATION DAMPING

[75] Inventor: Willem den Hollander, Schlieren, Switzerland

[73] Assignee: RCA Corporation, New York, N.Y.

[21] Appl. No.: 821,784

[22] Filed: Aug. 4, 1977

[30] Foreign Application Priority Data
Sep. 6, 1976 [GB] United Kingdom ............... 36864/76

[51] Int. Cl.² ........................................... H01J 29/56
[52] U.S. Cl. ..................................... 315/371; 315/408
[58] Field of Search ...................... 315/370, 371, 408

[56] References Cited
U.S. PATENT DOCUMENTS 3,944,879  3/1976  Suzuki ................................. 315/370
4,019,093  4/1977  Klein .................................... 315/370

Primary Examiner—Theodore M. Blum
Attorney, Agent, or Firm—Eugene M. Whitacre; Paul J. Rasmussen; William H. Meise

[57] ABSTRACT

A side pincushion correction circuit includes an impedance circuit coupled in series with the horizontal deflection coil. A switch coupled across at least a part of the impedance circuit is closed at a time during the retrace interval which is progressively advanced during a first portion of the horizontal retrace interval and progressively retarded during a second portion. Damping of the impedance circuit is provided by a second switch operated at a rate synchronous with the first. The second switch is coupled between a point of the impedance circuit and a voltage source.

9 Claims, 5 Drawing Figures

SIDE PINCUSHION CORRECTION CIRCUIT WITH LOW DISSIPATION DAMPING

BACKGROUND OF THE INVENTION

This invention relates to a pincushion correction circuit which is useful in a television apparatus.

A side or East-West pincushion correction apparatus is described in copending U.S. Ser. No. 722,600, filed Sept. 13, 1976 for Peter E. Haferl entitled, "PINCUSHION CORRECTION CIRCUIT," in which an impedance is coupled in series with the horizontal deflection coil. A switch is coupled in parallel with the impedance. The switch is operated during the second half of the horizontal retrace interval at times which are progressively advanced and retarded during each cycle of the vertical deflection. The average impedance in series with the horizontal deflection coil is thereby varied at a vertical deflection rate in such a manner as to correct for horizontal or side pincushion distortion. A damping circuit consisting of a resistor is coupled to the impedance network in order to minimize the effect of switching transients and thereby prevent undesirable oscillations in the switched impedance. The resistor may dissipate substantial amounts of power.

In the aforementioned arrangement, pincushion correction is achieved by controlling the amount of energy or current in the deflection winding at the beginning of the trace interval. This in turn is accomplished by controlling the impedance in series with the deflection winding during the second half of the retrace interval. When the average impedance is high, less current tends to flow in the deflection winding and the horizontal trace width is reduced. When the average impedance is low, more current flows in the deflection winding and the trace width increases. The average impedance in series with the deflection winding is controlled by the relative time at which the switch is closed. A smooth, continuously variable pincushion correction requires that the voltage waveform across the impedance network follow the waveform of the retrace pulse without spurious undamped oscillations. Such oscillation will cause the pincushion correction to vary in a manner not continuously related to the time at which the switch is closed.

SUMMARY OF THE INVENTION

A switched East-West or side pincushion correction circuit comprises an impedance circuit coupled with a horizontal deflection winding through which horizontal scanning current flows. A controllable switch is coupled with at least a portion of the impedance circuit and is operated at a time during the horizontal deflection interval. The time of operation of the controllable switch during the horizontal deflection interval is progressively advanced during a first portion of the vertical scanning interval and progressively retarded during a second portion of the vertical scanning interval. Low-loss damping means comprises a voltage source periodically coupled by a further switch to the impedance circuit at least a portion of the horizontal deflection interval.

DESCRIPTION OF THE INVENTION

Figure 1:
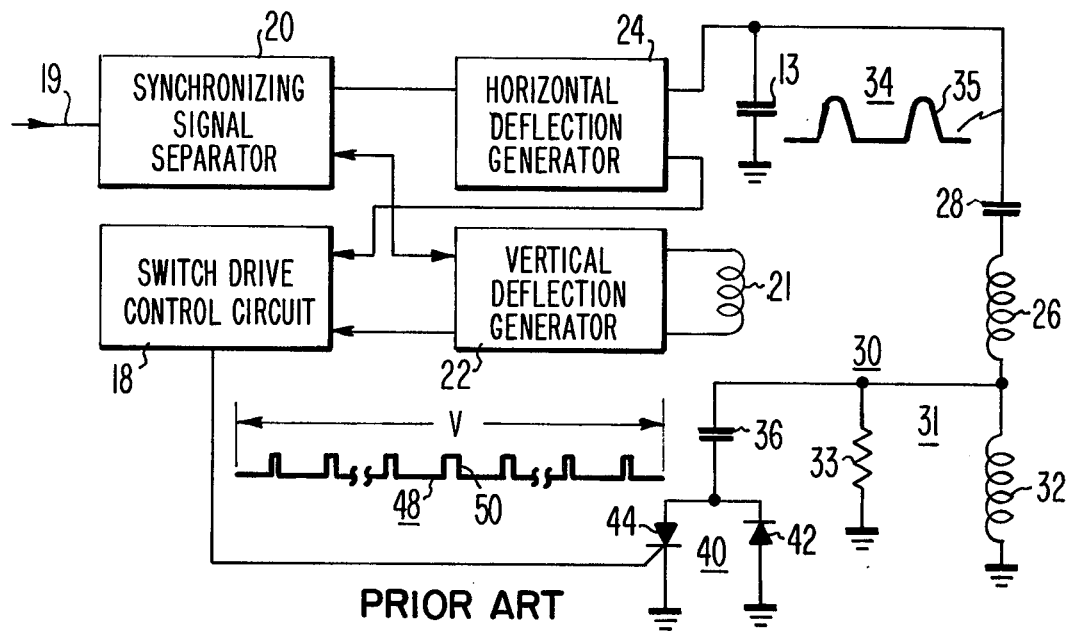
FIG. 1 is a diagram, partially in block and partially in schematic form of a portion of a television receiver embodying a prior art switched pincushion correction circuit.

FIG. 1 shows the deflection system of a television receiver including a synchronizing signal separator 20 which receives composite video signals at an input terminal 19 from a video detector, not shown. Separator 20 separates vertical synchronizing signals from the composite video and applies them to an input terminal of a vertical deflection generator 22. Vertical deflection generator 22 uses the vertical synchronizing signals to synchronize the generation of a vertical deflection current for application to a vertical deflection winding 21. Synchronizing signal separator 20 also separates horizontal synchronizing signals from the composite video and applies them to an input terminal of a horizontal deflection generator 24. Horizontal generator 24 processes the horizontal synchronizing signals to produce a sawtooth current through a horizontal deflection winding 26. "S" shaping of the horizontal deflection current is produced by a capacitor 28 coupled in series with horizontal deflection coil 26. A retrace capacitor 13 is connected between the output of the horizontal deflection generator and ground. A horizontal scanning rate voltage represented as waveform 34 having retrace pulses 35 appears across the horizontal deflection winding 26, "S" capacitor 28 and a series connected pincushion correction circuit designated generally by 30. Pincushion correction circuit 30 includes a controllable switch indicated generally as 40 coupled with an impedance network designated as 31, which includes an inductance 32 and capacitor 36. Switch 40 includes a thyristor 44 and an antiparallel coupled diode 42. A damping resistor 33 is coupled across inductor 32. It should be noted that the aforementioned U.S. application Ser. No. 722,600 describes use of a transformer in place of inductor 32. The use of an inductor as shown in FIG. 1 decreases the peak voltage occurring across switch 40, but is otherwise functionally equivalent to a transformer.

A switch drive control circuit 18 has inputs coupled to the vertical and horizontal deflection generators and produces a repetitive gating sequence 48 of gating pulses 50, each of which pulses occurs during the second half of the horizontal retrace interval. The trailing edge of individual pulses 50 of pulse sequence 48 occur at the time of termination of the retrace pulse. At the beginning of each repetitive sequence 48, corresponding to the top of the vertical scan, the leading edge of each pulse 50 occurs immediately prior to the trailing edge so that the pulses 50 are short in duration. Pulses 50 occurring after the beginning of vertical scan but before the center of the vertical scan interval have leading edges which are progressively advanced in time relative to the trailing edge. At the center of vertical scan, corresponding to the middle of the sequence of pulses 48, the leading edges of the individual pulses 50 approach the time of the center of the retrace pulses 35. From the center of the sequence 48 of pulses to the end of each sequence, which correspond to the middle and the bottom of vertical scan, respectively, the leading edges of the pulses 50 are progressively retarded relative to the time of center of retrace, until at bottom of vertical scan maximum retardation of the leading edge occurs, and the duration of a pulse 50 is again short.

The progressively advanced closure time of switch 40 during the first half of the vertical scan interval progressively reduces the average impedance in series with deflection winding 26, with the result that the energy stored in deflection winding 26 in the form of current at the beginning of the horizontal trace interval is progressively increased. Similarly, during the second half of the vertical scan interval, the progressive delay in the closure time of switch 40 during the second half of the horizontal retrace interval progressively increases the average impedance in series with deflection winding 26, so that the energy stored at the beginning of the horizontal trace interval progressively decreases towards the end of the vertical scan interval, thereby providing side pincushion correction. Switch 40 remains closed during the horizontal trace interval, and a sinusoidal resonant current flows in the circuit including winding 32, coil 36 and switch 40. At the end of each horizontal trace interval, switch 40 is opened by a reversal of the current then flowing through diode 42, with thyristor 44 not enabled for conduction by gating sequence 48.

As mentioned, oscillations can occur in impedance network 31 during the time that switch 40 is open as a result of switching transients or other causes. These may cause the voltage appearing across impedance network 31 to have uncontrolled fluctuations, rather than smoothly following the retrace voltage. For example, the voltage appearing across pincushion correction circuit 30 of FIG. 1 should be a fraction of the retrace voltage 35, depending upon the magnitude of impedance network 31 relative to the impedance of deflection winding 26 and capacitor 28.

Figure 2:
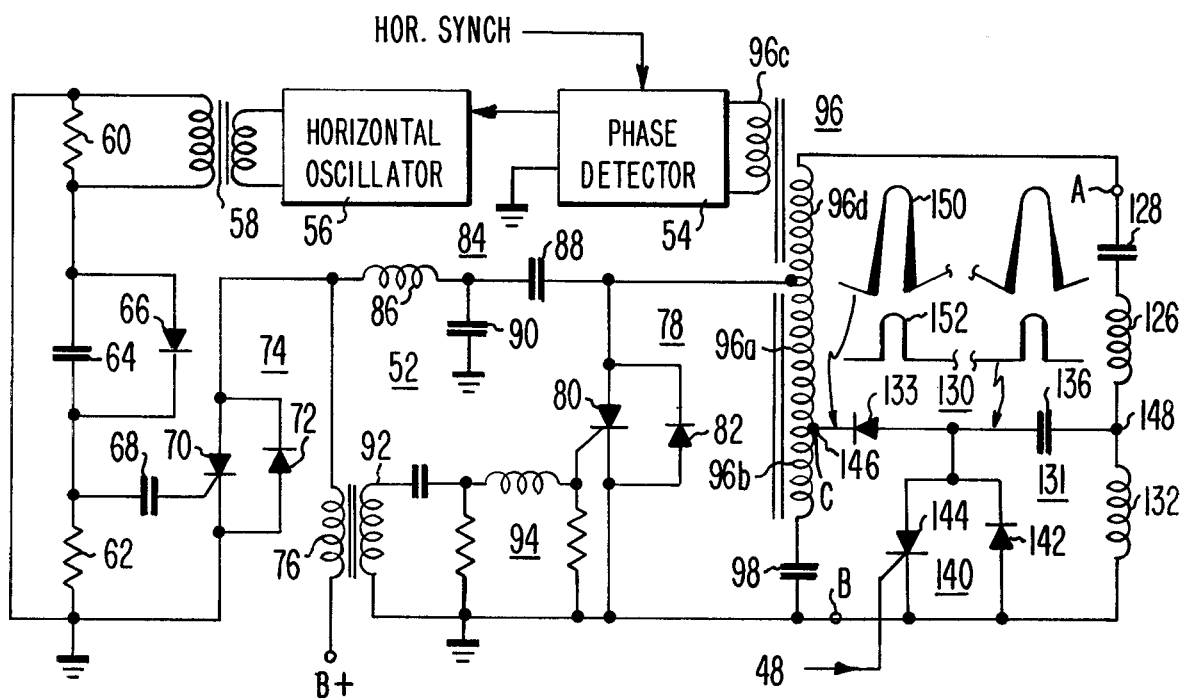
FIG. 2 shows, partially in block and partially in schematic form a portion of a television receiver embodying the invention.

FIG. 2 shows a diagram, partially in block and partially in schematic form, of a horizontal deflection generator such as that described in U.S. Pat. No. 3,452,444 as an example of a generator 24 of FIG. 1, together with a switch pincushion correction circuit embodying the invention. In FIG. 2, a horizontal deflection generator designated generally as 52 includes a phase detector 54 having an input coupled to receive horizontal synchronizing pulses from a source such as a synchronizing signal separator 20 of FIG. 1. An output of phase detector 54 is coupled to the input of a horizontal oscillator 56 which produces pulses at the horizontal rate. The horizontal rate pulses produced by oscillator 56 are coupled through a transformer 58 and a waveshaping network including resistors 60 and 62, a capacitor 64 and diode 66. The horizontal-rate pulses appearing across resistor 62 are coupled through a capacitor 68 to the gate of a thyristor 70. Thyristor 70 together with antiparallel coupled diode 72 forms a commutating switch designated generally as 74. Commutating switch 74 has one end connected to ground. The other end of switch 74 is connected through a relatively large-valued input inductor 76 to B+, the source of operating potential. Another bidirectional switch designated generally as 78 includes a thyristor 80 and antiparallel-connected diode 82. One end of switch 78 is coupled to ground. The other end of switch 78 is coupled to the junction of bidirectional switch 74 and input inductor 76 by means of a commutating circuit designated generally as 84. Commutating network 84 includes a commutating inductor 86, coupled in series with a commutating capacitor 88, and an auxiliary capacitor 90 coupled from their junction to ground. A winding 92 is magnetically coupled to input inductor 76. A waveshaping network designated generally as 94 coupled winding 92 to the gate of trace thyristor 80.

An output transformer designated generally as 96 has series coupled windings 96a and 96b. The low-voltage end of winding 96b is coupled to ground by means of a capacitor 98. The end of winding 96a remote from winding 96b is coupled to the end of trace switch 78 remote from ground. Transformer 96 has a third winding 96c coupled to an input of phase detector 54 has for providing a timing reference thereto. Transformer 96 has a fourth winding 96d having one end coupled to the end of winding 96a remote from ground, thereby forming an autotransformer. The high-voltage end of winding 96d is coupled by a terminal A to one end of a series-connected deflection winding 126 and S-shaping capacitor 128. The other end of the series connection of winding 126 and capacitor 128 is coupled to a pincushion correction circuit designated generally as 130 and thence to ground at a terminal B.

Pincushion correction circuit 130 includes a winding 132 of impedance network 131 coupled in series with deflection winding 126. A capacitor 136 has one end coupled to the junction 148 of windings 126 and 132. The other end of capacitor 136 is coupled to ground by way of a bidirectional switch designated generally as 140 and including antiparallel-coupled thyristor 144 and diode 142. A damping diode 133 is coupled to impedance network 131 at the junction of capacitor 136 and switch 140 and to a tap C on output transformer 96.

The operation of horizontal deflection circuit 52 is described in detail in U.S. Pat. No. 3,452,444. A brief description of the operation is, however, included here. During the second half of the horizontal trace interval, thyristor 80 is conducting both the deflection current and primary current of autotransformer 96. This current is increasing with time due to the energy stored as voltage on capacitors 98 and 128. A relatively large voltage is stored on commutating capacitor 88 and auxiliary capacitor 90, and commutating switch 74 is open. Before the end of the horizontal trace interval, horizontal oscillator 56 produces a pulse which gates commutating switch 74 into conduction. This closes a resonant path including commutating circuit 84, commutating switch 74 and trace switch 78. Current builds up in this resonant path until it equals and exceeds the combined deflection and output transformer primary currents. Thyristor 80 therefore opens and diode 82 then becomes conductive to carry the excess of the resonant current over the deflection and transformer primary current. The resonant current flow through commutating circuit 84 and switches 74 and 78 then decreases, diode 82 becomes nonconductive and switch 78 opens. This begins the retrace interval. During retrace, the voltage on the commutating capacitors 88 and 90 increases to a peak, and the current in the resonant circuit including the commutating circuit 84, switch 74, deflection winding 126 and primary 96a, 96b then reverses so that diode 72 in commutating switch 74 carries the current. Current increases in the deflection winding and primary of transformer 96 as the voltage on the commutating capacitors decreases. As the voltage across the trace switch reaches zero, diode 82 becomes conductive to end the retrace interval and begin the trace interval. Energy stored as current in the deflection winding charges the S capacitor with a linearly decreasing scanning current during the first half of trace.

Pincushion correction circuit 130 operates generally in conjunction with the deflection winding as does pincushion correction circuit 30 of FIG. 1. In the absence of damping, oscillations can occur on the crest of that portion of the retrace voltage appearing across the impedance network. The voltage waveform across the impedance network and switch should exactly follow the waveform of the retrace pulse, albeit at a lower amplitude, for otherwise a continuous variation of the time at which switch 140 is gated into conduction during the retrace interval will not give a corresponding variation of the horizontal deflection amplitude. Because the shape of the voltage appearing across impedance network 131 is desirably exactly like the shape of a retrace pulse, it is possible to connect impedance network 131 to tap C. The pulse amplitude on tap C is selected slightly lower than the amplitude of the retrace voltage appearing across pincushion switch 140 during the time when switch 140 is nonconductive. When damping diode 133 is conductive, the voltage at the junction of the diode and the impedance network will be substantially identical to the voltage on tap C.

When switch 140 becomes conductive at some time during the second half of the horizontal retract interval, the end of diode 133 remote from tap C goes to approximately ground potential. The voltage at tap C during the retrace interval is the sum of the positive retrace voltage occurring across the transformer and the positive direct potential appearing across capacitor 98. Consequently, during the retrace interval tap C is positive with respect to ground. Therefore, when switch 140 becomes conductive, the cathode of diode 133 is made positive and it becomes nonconductive.

During the succeeding trace interval, switch 140 remains conductive, so the anode of diode 133 remains at ground potential. Tap C is selected so that the negative trace-interval voltage attributable to the transformer does not exceed the positive voltage across capacitor 98. Consequently, diode 133 remains nonconductive during the horizontal trace interval, and only becomes conductive during that portion of the horizontal retrace interval during which pincushion switch 140 is nonconductive. The voltages at tap C and across switch 140 are respectively represented by waveforms 150 and 152. As seen on an oscilloscope over a vertical interval, the sides of the horizontal rate pulses appear thickened because of the variation of gating time over the vertical interval.

As described, diode 133 couples the voltage at tap 146 of the primary winding of horizontal output transformer 96 to pincushion correction circuit 130 during a portion of the horizontal retrace interval. During that portion during which this coupling occurs, oscillations occurring in the impedance network or at the switch are heavily damped. No waste of energy occurs because power is transferred from the impedance network back to the horizontal output transformer, and to the circuits loading the horizontal output transformer. This power transfer produces additional pincushion correction because power is taken from the deflection circuit during the time that switch 140 is open, and since this time is modulated at the vertical deflection rate the amount of power transferred is also modulated. When diode 133 is open, no waste of power occurs and damping is not needed because switch 140 is closed or conductive.

The inductance of the linearity coil used in conjunction with practical television circuits may require modulation at the vertical deflection rate. The sinusoidal resonant current flowing during the trace interval in the pincushion correction circuit can be used to modulate the linearity coil.

Figure 3:
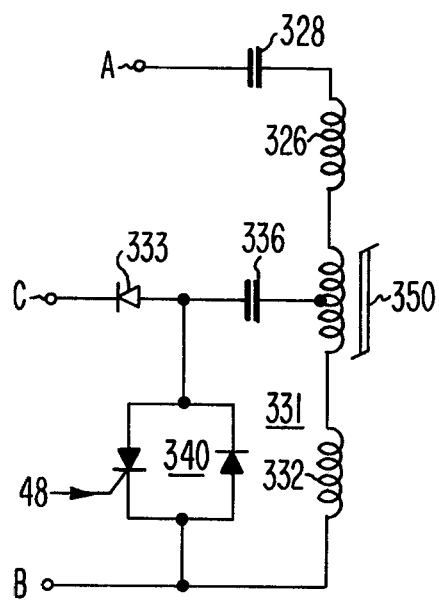
FIGS. 3, 4 and 5 show in schematic form alternative embodiments of portions of the television receiver of FIG. 2.
Figure 4:
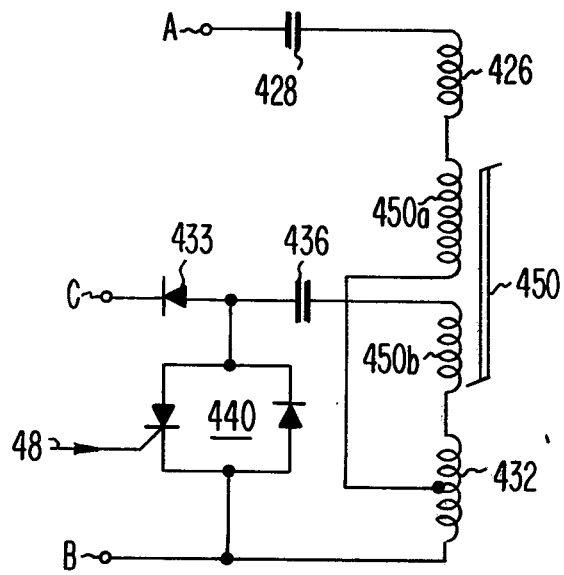
Figure 5:
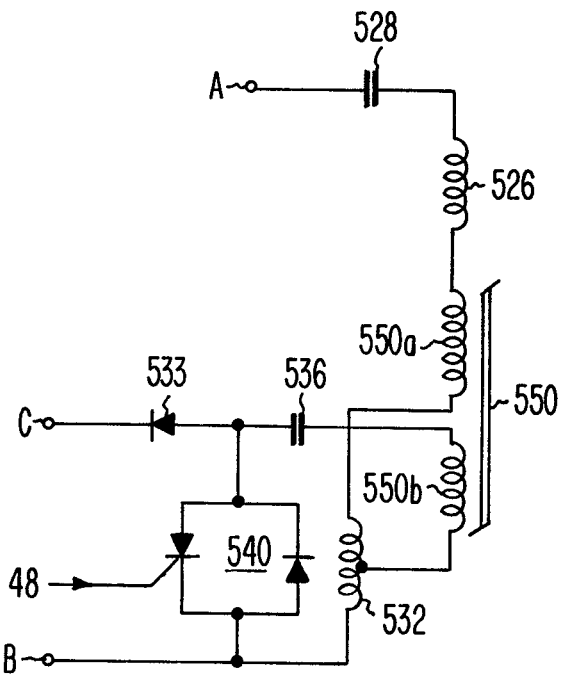

FIGS. 3, 4 and 5 show alternative deflection and damped pincushion correction arrangements suitable for connection between terminals A, B and C of FIG. 2 and which additionally modulate a linearity coil. Components having numbers in the 100 series in FIG. 2 have corresponding numbers in the 300 series in FIG. 3, 400 series in FIG. 4 and 500 series in FIG. 5. The linearity coil being modulated in each of the FIGURES has reference number 50 in each of the corresponding series.

In FIG. 3, the resonant sinusoidal current occurring during the trace interval in inductor 332, capacitor 336 and switch 340 also flows in that portion of linearity coil 350 extending from a tap 348 on the linearity coil to inductor 332, thereby varying the saturation of the core and therefore of the inductance of coil 350.

FIG. 4 shows an arrangement including a linearity coil 450 having a first winding 450a, the inductance of which is controlled by the current in a second winding 450b. Control winding 450b is coupled in series with inductor 432, and varies the inductance of winding 450a in consonance with the resonant current flow in winding 432, capacitor 436 and switch 440. In order to accommodate the use of a higher-voltage, lower current thyristors and diodes in switch 440, the deflection current is coupled to a tap on winding 432, which thus acts as an autotransformer.

In FIG. 5, low-voltage, high-current switch components are accommodated by coupling the deflection current to the high-impedance point of an inductor 532 connected as an autotransformer. The low-impedance tap of winding 532 is coupled by a control winding 550b of linearity coil 550 to a capacitor 536 and switch 540. Resonant current flow in capacitor 536, winding 532, coil 550b and switch 540 modulates winding 550a which is series connected with the deflection coil.

It will be apparent to those skilled in the art that any of a number of unidirectional current conducting devices, such as rectifiers or transistors, may be used in place of diode 133, and that thermionic unidirectional current conducting devices as well as semiconductor devices may be used, depending on the circuit parameters. It will also be clear that the voltage source to which the impedance network is coupled may have a substantial internal impedance, so long as the impedance is low in relation to the impedance of the network being damped, and that if the impedance of the voltage source is sufficiently low an impedance device such as a resistor may be placed in series with the pincushion damping diode to control the damping current. Further, the pincushion damping diode may be coupled to any of a number of points in the impedance network, whereby the effective impedance presented to the voltage source may be varied.

In a circuit such as that of FIG. 3, the following component values were found to be suitable for a particular application:
  L322: 350µH
  L326: 1.12mH
  C98: 12µF
  C128: 1µF
  C136: 1µF

What is claimed is:
1. A switched East-West raster correction circuit for a television deflection apparatus including a generator of periodic horizontal-rate deflection current, comprising:

a horizontal deflection winding coupled to the horizontal deflection current generator for accepting horizontal deflection current therefrom;

an impedance circuit coupled in circuit with said deflection winding and defining in conjunction with said winding a path for said horizontal deflection current;

controllable switch means coupled in circuit with said impedance circuit and operated at a time during each horizontal period which is progressively altered in a manner to reduce raster distortion; and damping means including a voltage source and second switch means for coupling said voltage source with said impedance circuit during at least a portion of said horizontal period for reducing oscillations.

2. A switched East-West raster correction circuit for a television deflection apparatus including a generator of periodic horizontal-rate deflection current, comprising:

a horizontal deflection winding coupled to the horizontal deflection current generator for accepting horizontal deflection current therefrom during alternate trace and retrace intervals;

an impedance circuit coupled in circuit with said deflection winding and defining in conjunction with said winding a path for said horizontal deflection current;

controllable switch means coupled in circuit with said impedance circuit and operated at a time during said retrace intervals which is progressively altered in a manner to reduce raster distortion; and damping means including a voltage source and second switch means for coupling said voltage source with said impedance circuit during at least a portion of said retrace intervals for reducing oscillations.

3. A switched East-West raster correction circuit according to claim 2 wherein said controllable switch means is operated at a time during the second half of said retrace interval, which time is progressively advanced during a first portion of the vertical scanning interval and progressively retarded during a second portion of the vertical scanning interval; and said second switch means couples said voltage source to said impedance circuit during at least a portion of said retrace interval.

4. A switched East-West pincushion correction circuit according to claim 1 wherein said voltage source comprises a point on a horizontal output transformer coupled to said horizontal deflection generator.

5. A switched East-West pincushion correction circuit in accordance with claim 4 wherein said second switch means coupling said point on said horizontal output transformer with said impedance circuit comprises undirectional current conducting means.

6. A switched East-West pincushion correction circuit according to claim 5 wherein said unidirectional current conducting means comprises a diode.

7. A switched East-West pincushion correction circuit according to claim 5 wherein said point on said horizontal output transformer is coupled with a direct voltage source.

8. A switched East-West pincushion correction circuit according to claim 7 wherein said direct voltage source comprises capacitance means serially coupled with a winding of said horizontal output transformer.

9. A switched East-West pincushion correction circuit according to claim 8 wherein the voltage appearing across said capacitance means exceeds the voltage appearing across that portion of said horizontal output transformer coupled between said capacitance means and said point on said horizontal output transformer.

* * * * *